(12) United States Patent
Ippers et al.

(10) Patent No.: US 8,795,453 B2
(45) Date of Patent: Aug. 5, 2014

(54) DEVICE AND METHOD FOR PROCESSING A PACKING MATERIAL USING ULTRASOUND

(75) Inventors: Juergen Ippers, Grefrath (DE); Ulrich Wieduwilt, Schwaebisch (DE)

(73) Assignee: Robert Bosch GmbH, Stuttgart (DE)

( * ) Notice: Subject to any disclaimer, the term of this patent is extended or adjusted under 35 U.S.C. 154(b) by 370 days.

(21) Appl. No.: 13/263,773

(22) PCT Filed: Feb. 26, 2010

(86) PCT No.: PCT/EP2010/052486
§ 371 (c)(1),
(2), (4) Date: Jan. 3, 2012

(87) PCT Pub. No.: WO2010/115661
PCT Pub. Date: Oct. 14, 2010

(65) Prior Publication Data
US 2012/0111475 A1    May 10, 2012

(30) Foreign Application Priority Data

Apr. 9, 2009  (DE) .......................... 10 2009 002 296

(51) Int. Cl.
*B32B 37/00* (2006.01)
*B29C 65/08* (2006.01)
*B29C 65/00* (2006.01)

(52) U.S. Cl.
CPC ......... *B29C 65/087* (2013.01); *B29C 66/83411* (2013.01); *B29C 66/83511* (2013.01); *B29C 66/92* (2013.01)
USPC ......... 156/64; 156/73.1; 156/350; 156/580.1; 156/580.2

(58) Field of Classification Search
CPC .... B29C 65/08; B29C 65/083; B29C 65/085; B29C 65/086; B29C 65/087; B29C 66/83411; B29C 66/83511; B29C 66/92
USPC ............... 156/64, 73.1, 350, 555, 580, 580.1, 156/580.2, 582, 583.1
See application file for complete search history.

(56) References Cited

U.S. PATENT DOCUMENTS

| | | | |
|---|---|---|---|
| 4,517,790 A | 5/1985 | Kreager | |
| 5,643,396 A | 7/1997 | Rajala et al. | |
| 5,855,706 A * | 1/1999 | Grewell | 156/64 |
| 6,168,063 B1 * | 1/2001 | Sato et al. | 228/1.1 |
| 6,190,296 B1 | 2/2001 | Gnad et al. | |

(Continued)

OTHER PUBLICATIONS

PCT/EP2010/052486 International Search Report (2 pages).

*Primary Examiner* — James Sells
(74) *Attorney, Agent, or Firm* — Michael Best & Friedrich LLP

(57) ABSTRACT

A device and a method is proposed whereupon the device for processing a packing material using ultrasound comprises the following elements: at least one sonotrode (10), at least one anvil (12), whereupon a gap is constructed between sonotrode (10) and anvil (12) through which the packing material can be passed for the purpose of ultrasonically sealing a packing material, at least one adjustment means (50) that adjusts the gap (s) between sonotrode (10) and anvil (12), at least one generator (70) that changes an input voltage into an output voltage, which a converter (74) transforms into mechanical oscillations in order to generate ultrasonic oscillations on the sonotrode (10), whereupon a regulation device and/or control device (78) is arranged to regulate or control the gap (s) between sonotrode (10) and anvil (12) depending on at least one electric variable (P,E,R) that acts on the sonotrode (10).

20 Claims, 8 Drawing Sheets

(56) References Cited

U.S. PATENT DOCUMENTS

| | | | |
|---|---|---|---|
| 6,508,641 B1 * | 1/2003 | Kubik | 425/174.2 |
| 6,540,854 B2 * | 4/2003 | Couillard et al. | 156/64 |
| 6,547,903 B1 | 4/2003 | McNichols et al. | |
| 8,028,503 B2 * | 10/2011 | Capodieci | 53/479 |
| 2006/0144904 A1 | 7/2006 | Mlinar et al. | |
| 2007/0251643 A1 | 11/2007 | Umebayashi et al. | |

* cited by examiner

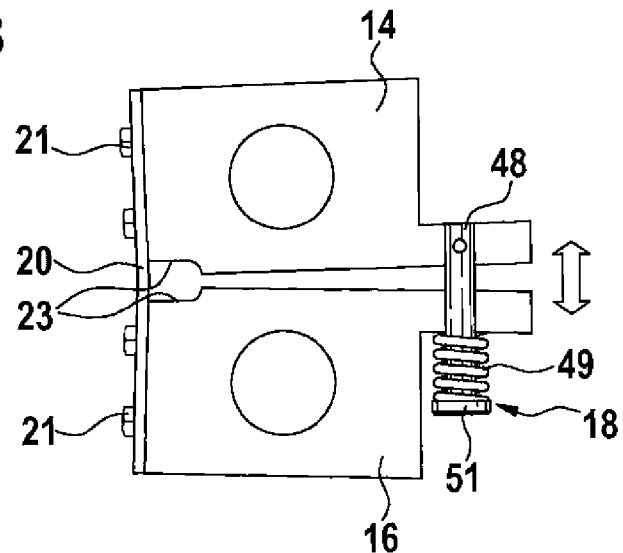
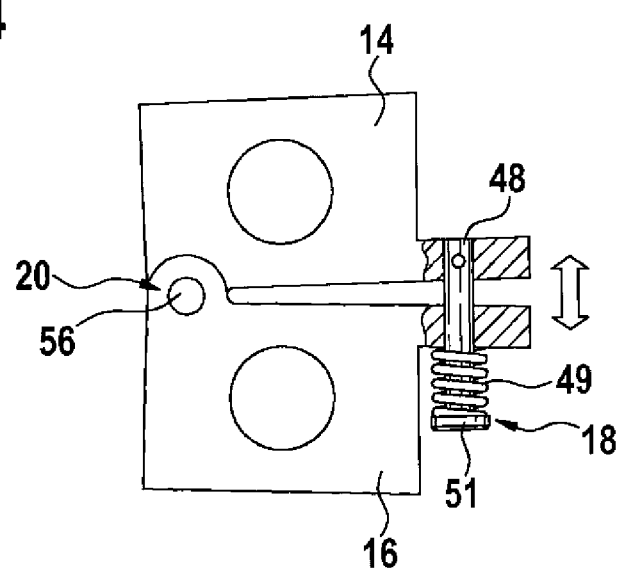

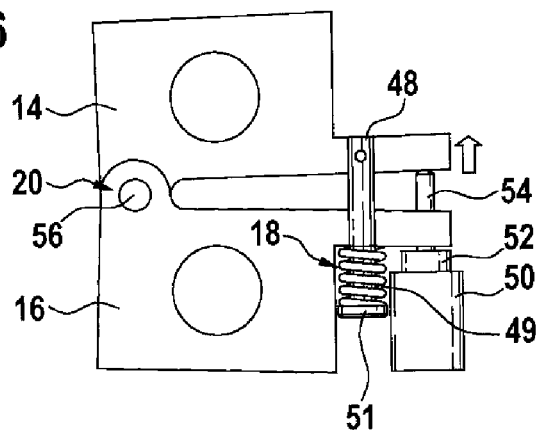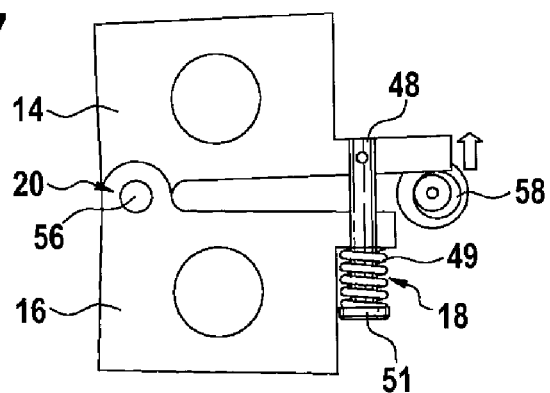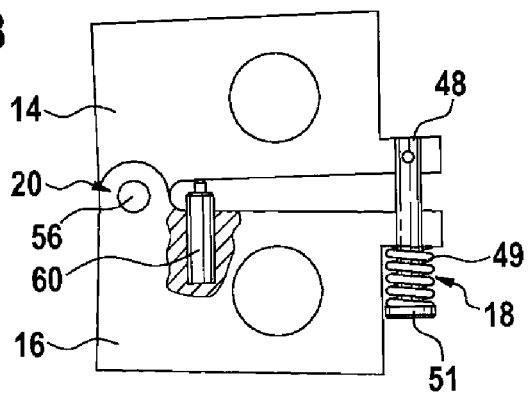

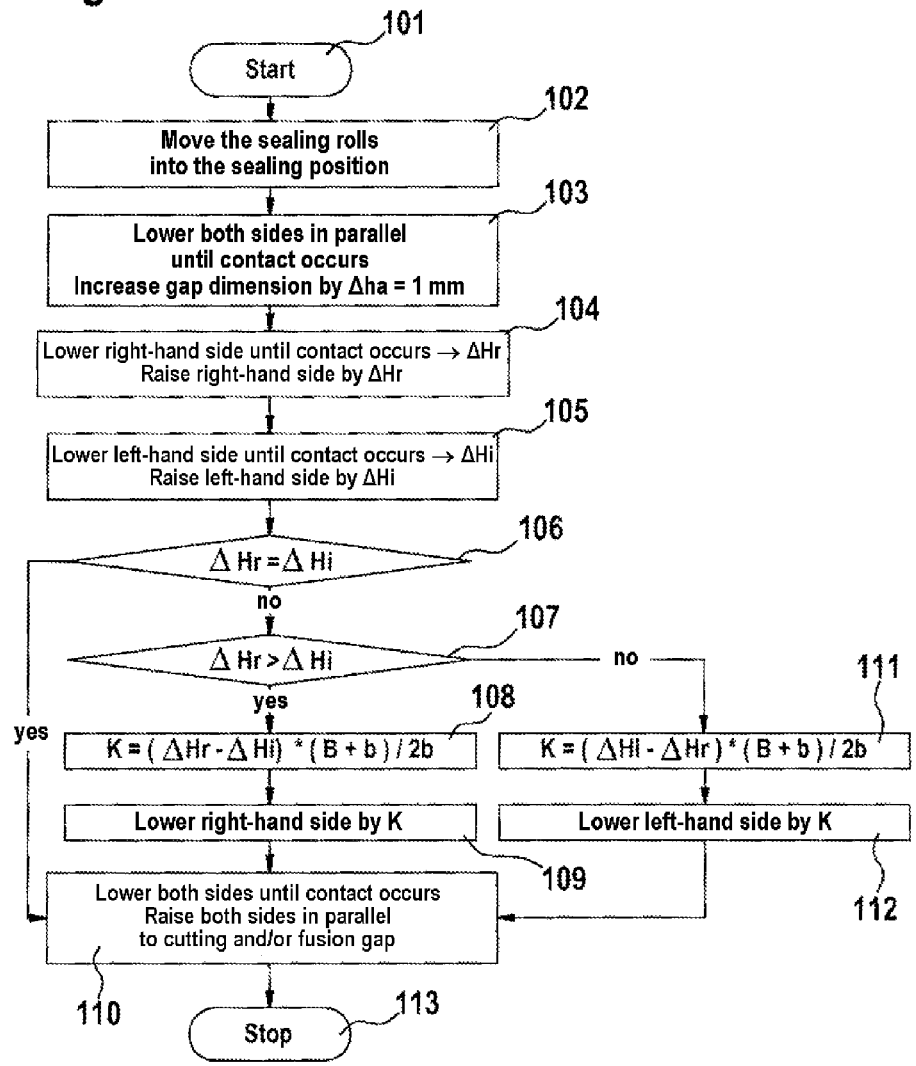

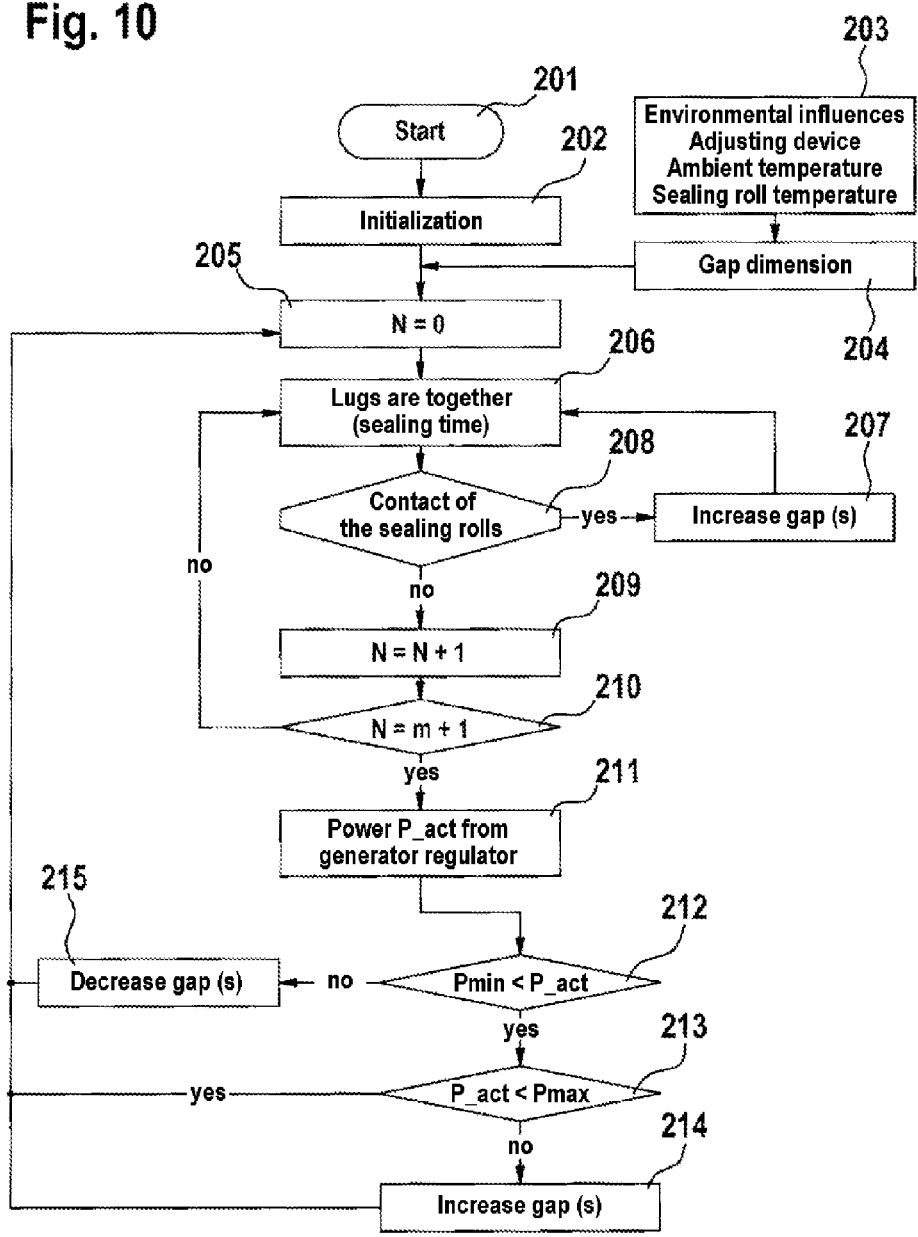

DEVICE AND METHOD FOR PROCESSING A PACKING MATERIAL USING ULTRASOUND

BACKGROUND OF THE INVENTION

The invention is based on a device and a method for processing a packing material by means of ultrasound. DE 197 537 40 C1 discloses a device for processing a material strip, having an ultrasound unit which has a sonotrode and a counterpart tool. The material strip is guided through a gap between the sonotrode and counterpart tool, wherein the sonotrode is clamped in a carriage and can be adjusted relative to the counterpart tool by means of an adjusting device. The force with which the sonotrode is loaded in the direction of the counterpart tool is measured by means of a force sensor. By means of the pressing force of the sonotrode thus determined, the sonotrode can be moved toward the counterpart tool or away from the counterpart tool by means of a control device. The optimum pressing force is determined in advance in tests and is stored as a setpoint value in the control and/or regulating device.

SUMMARY OF THE INVENTION

The invention is based on the object of specifying a device and a method in which adjustments and regulation of the sealing gap are further improved and consistent quality of the sealing seam is attained.

In contrast to this, the device and method according to the invention have the advantage that a more uniform spacing of the sealing rolls to one another can be reliably maintained even in the event of temperature fluctuations. This permits consistent quality of the sealing seam. The regulation and/or control of the sealing gap takes place as a function of at least one electric variable which acts on the sonotrode. This may be an electric output variable of a generator which provides high-frequency electrical energy for generating mechanical ultrasound vibrations to a converter, which in turn acts correspondingly on the sonotrode. Electric variables can be very easily integrated into a regulation and/or control system and are often provided in any case. For example, the generator power or energy is available in a corresponding generator regulator. On the other hand, a targeted voltage loading of the sonotrode—as a further electric variable—may in a particularly simple manner be a constituent part of a contact detection system.

With the gap measurement by means of an electric variable of the generator regulator in combination with contact detection, it is possible to dispense with an additional temperature sensor for further correction. Separate force sensors are also no longer required. The contact detection system provides the application of a voltage to the upper and lower sealing rolls, wherein an electrical sparkover would occur shortly before contact. In this way, the directly impending contact of the sealing rolls can be determined from an electrical current flow, and is therefore suitable in particular for a region to which the gap measurement by means of the electric variable of the generator regulator is not particularly well suited. All the gap sizes are therefore reliably detected. Also, the current flow upon contact can be detected particularly easily and integrated into the regulation or control of the gap.

In one expedient refinement, the regulator or controller is initialized by virtue of at least one of the sealing rolls performing a parallel movement until contact occurs. Finally, only one side is lowered until contact occurs, and then the other side. In this way, it is ensured that the sealing rolls are parallel to one another. This process may take place automatically.

BRIEF DESCRIPTION OF THE DRAWINGS

Exemplary embodiments of a device and method for processing a packing material by means of ultrasound are illustrated in the drawing and will be described in more detail below.

In the drawing:

FIG. 3 shows a side view of a coupling means, FIG. 4 shows a side view of a further alternative coupling means, FIG. 6 shows a side view of a first adjusting device, FIG. 7 shows the side view of a second adjusting device, FIG. 8 shows the side view of a third adjusting device, FIG. 9 shows a flow diagram of the initialization, FIG. 10 shows a flow diagram of the gap regulation.

DETAILED DESCRIPTION

Figure 1:
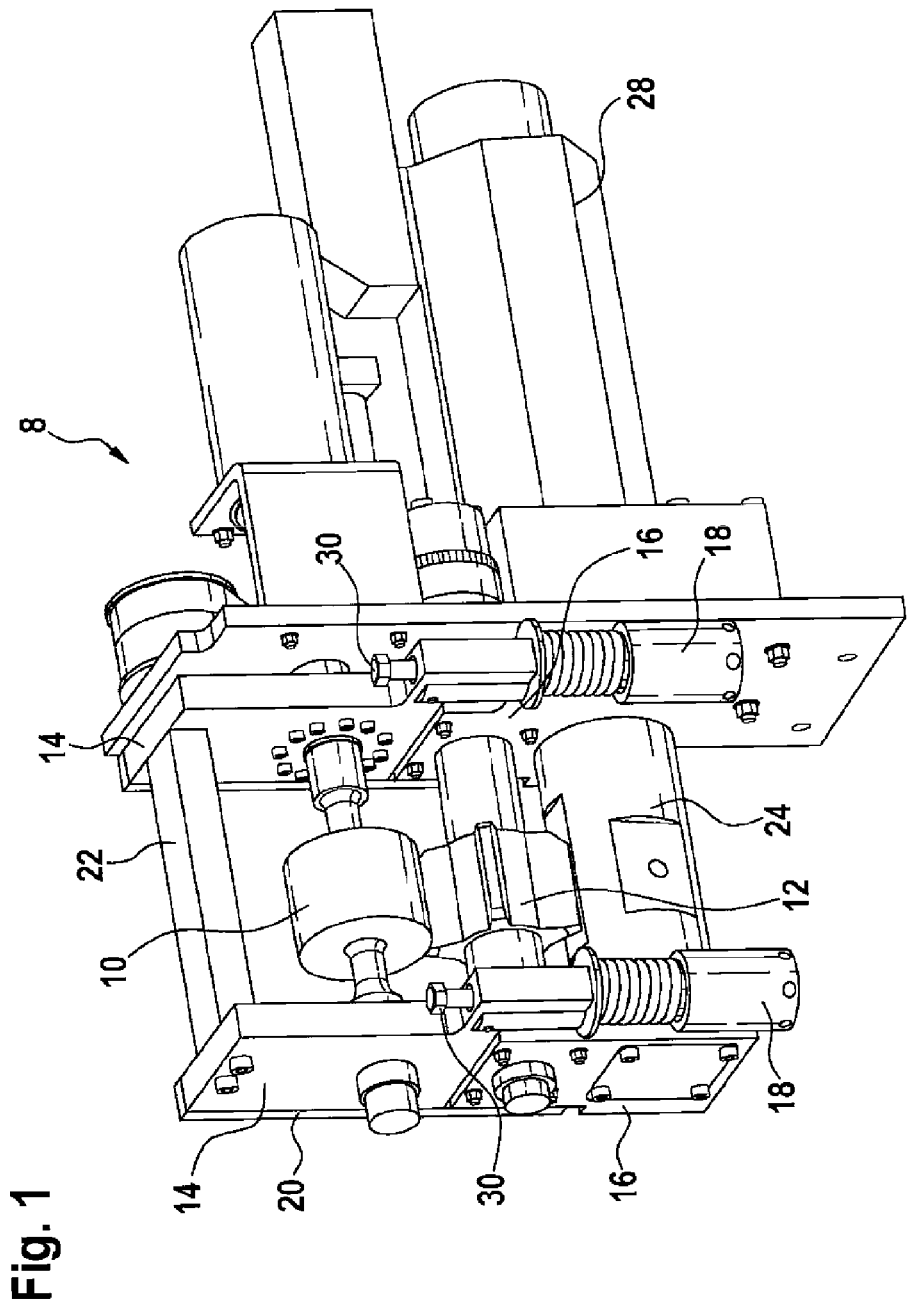
FIG. 1 shows a perspective front view of the device for processing a packing material.

In the device according to FIG. 1, a sonotrode 10 is rotatably mounted on both sides by in each case one bearing shield 14. The two bearing shields 14 for the sonotrode 10 are laterally connected to one another at the top side of the device 8 by an upper support means 22, designed here by way of example as a support beam. A likewise rotatably mounted anvil 12 interacts with the sonotrode 10. The anvil 12 is mounted in two bearing shields 16. The bearing shield 14 of the sonotrode 10 is connected by a coupling means 20 to the bearing shield 16, situated therebelow in each case, of the anvil 12. The two bearing shields 16 of the anvil 12 are in turn laterally connected to one another by a lower support means 24, which is formed by way of example as a support tube. Arranged in each case on the opposite side of the coupling means 20 in relation to the axes of rotation of the sonotrode 10 and anvil 12 are force means 18 by means of which the required sealing force can be applied to the sealing surface of the sonotrode 10 and anvil 12. Adjusting means 30 are provided in each case above the force means 18. In this way, the sealing force or sealing gap s can be adjusted.

Figure 2:
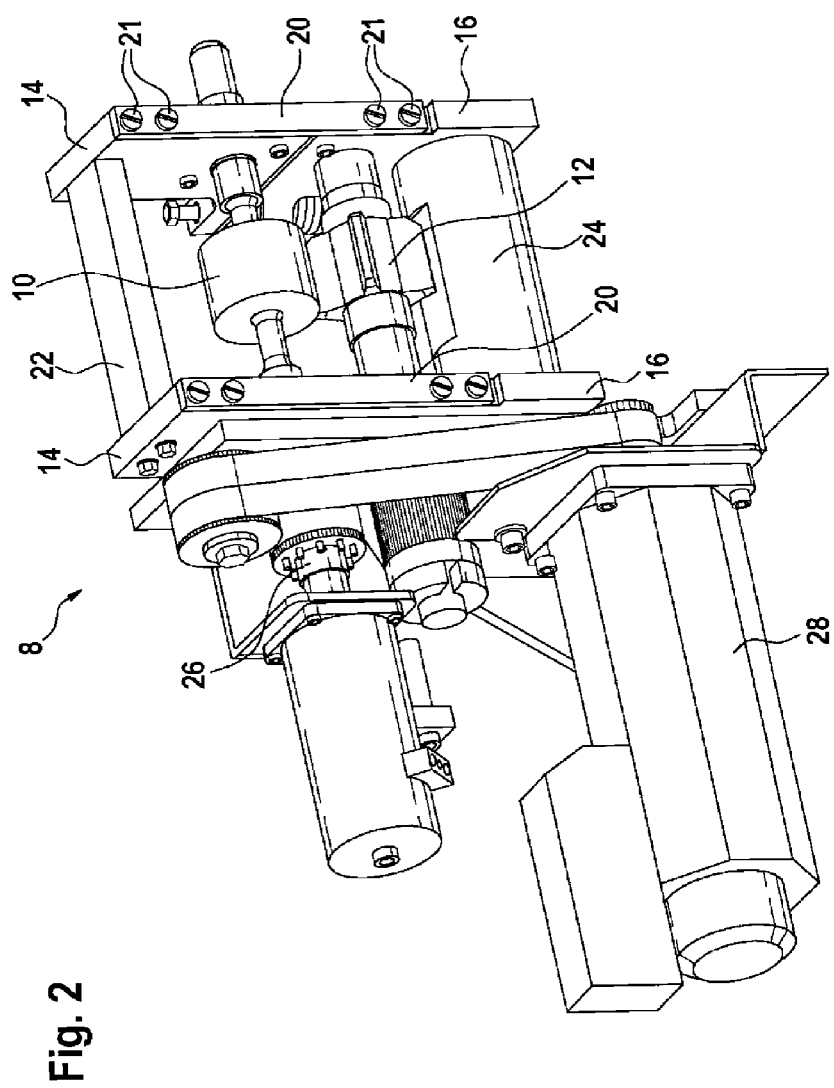
FIG. 2 shows the rear view of the device according to FIG. 1.

In the rear view, shown in FIG. 2, of the device 8 described in FIG. 1, it is clear that the bearing shield 14 of the sonotrode 10 is connected in each case to the bearing shield 16, arranged therebelow, of the anvil 12 by the coupling means 20, which is designed by way of example as a bending beam. The coupling means 20 is connected at the top end to the end side of the bearing shield 14 by means of two fastening elements 21, and is connected at the bottom end to the bearing shield 16 by means of two fastening elements 21. Here, a gap is provided between the bottom edge of the bearing shield 14 of the sonotrode 10 and the top edge of the bearing shield 16 of the anvil 12, which gap is bridged only by the coupling means 20. Furthermore, a drive 28 is provided which, by means of a drive element 26, drives both the sonotrode 10 and also the anvil 12 in opposite directions.

In the view of FIG. 3, the bearing receptacles for the rotating sonotrode 10 and the rotating anvil 12 are visible as round openings. The bearing shield 14 of the sonotrode 10 is connected to the bearing shield 16 of the anvil 12 at one side by the coupling means 20, which is designed as a bending beam. On the opposite side, the force means 18 loads the bearing shields 14, 16 with a force toward one another via the coupling means 20, which acts as a joint. In the direction of the coupling means 20, the bearing shields 14, 16 each have recesses 23. The desired bending capability of the bending beam 20 can thus be influenced by the bending length formed in this way. In the arrangement shown, the bending beam acts as a center of rotation, by means of which the spacing between the sonotrode 10 and anvil 12 can be varied. The design of the coupling means 20 as a bending beam offers a relatively rigid but nevertheless articulated connection between the two bearing shields 14, 16. The use of a bending beam as a coupling means 20 also acts as an overload protection means in the event of a crash. The bending beam 20 thus permits a defined opening and bending of the sealing gap s between the sonotrode 14 and anvil 16 even in the event, for example, of a product or foreign body becoming jammed between the sonotrode 10 and anvil 12.

The gap s between the sonotrode 10 and anvil 12 can be varied according to adjustment. The force means 18 has the effect of moving the upper and lower bearing shields 14, 16 toward one another about the center of rotation 56, and thereby imparting a force to the sealing surfaces. For this purpose, a plunger 48 is connected at one side to the bearing shield 14 of the sonotrode 10 such that a movement of the plunger 48 also causes a movement of the bearing shield 14. The plunger 48 is guided through an opening in the bearing shield 16 of the anvil 12, so as to be movable relative to the bearing shield 16, and ends with a flange 51. The flange 51 serves as a support surface for a spring 49 which, at the other side, is supported against the underside of the bearing shield 16 of the anvil 12. The spring 49 is designed as a spiral spring and surrounds the plunger 48. The force means 18 is preferably designed to be adjustable. For this purpose, it would for example be possible for the adjusting means 30 in the form of a screw to vary the preload of the spring 49 and thereby ultimately the sealing force.

In the exemplary embodiment of FIG. 4, as a coupling means 20, a bush-pin connection is provided which permits a rotational movement of the two bearing shields 14, 16 relative to one another about a center of rotation 56. It is however essential that the coupling means 20 permits a relative movement between the bearing shield 14 of the sonotrode 10 and the bearing shield 16 of the anvil 12 in such a way that the sonotrode 10 and anvil 16 can be moved relative to one another in order to realize the adjustment of a gap s depending on the packing material. The axis of rotation about the center of rotation 56 is parallel to the axis of rotation of the sonotrode 10 and anvil 12.

Figure 5:
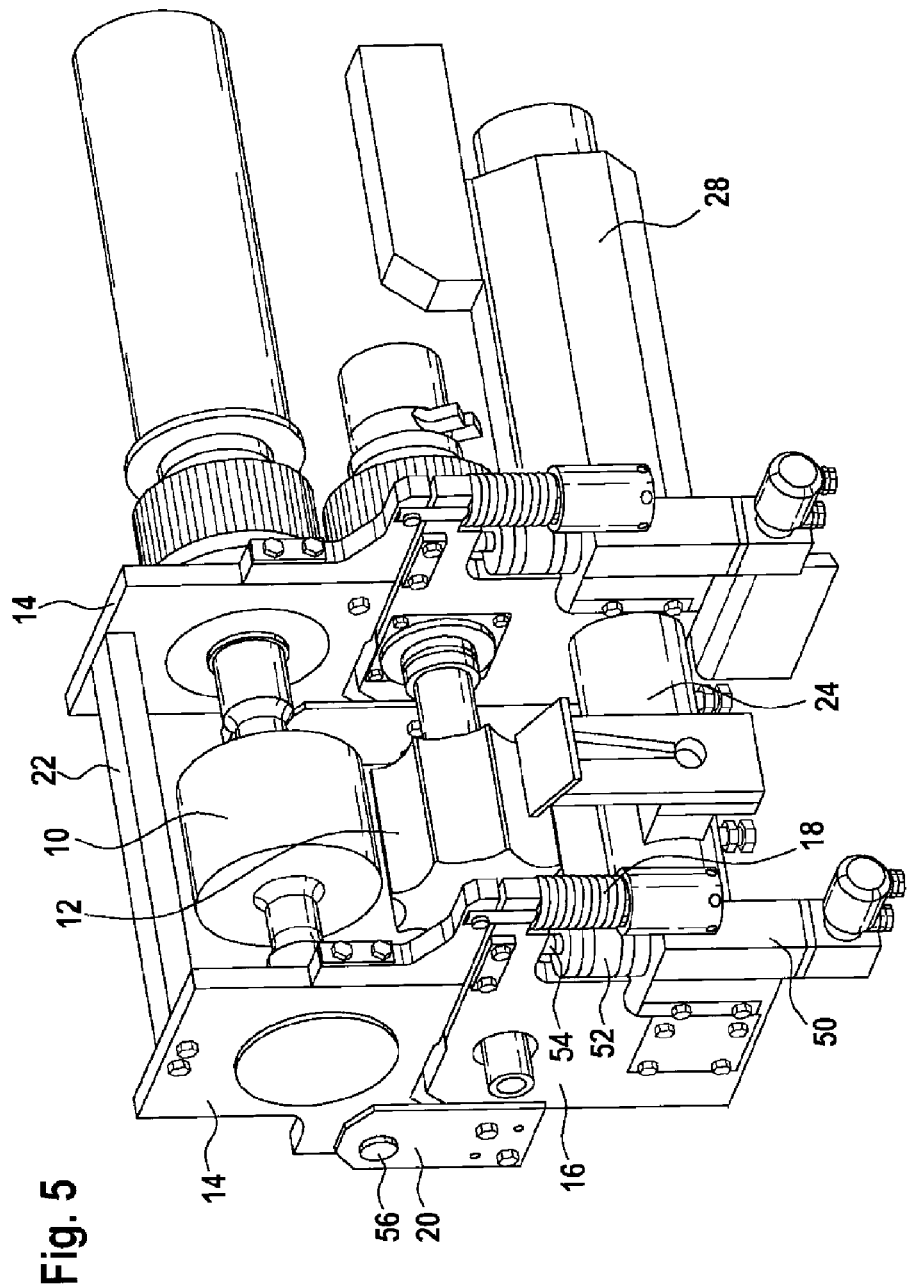
FIG. 5 shows a perspective illustration of a further exemplary embodiment of the device for processing a packing material, expanded to include an adjusting means.

The exemplary embodiment of FIG. 5 differs from that of FIGS. 1 and 2 substantially in that adjusting means 50 are additionally shown. The adjusting means 50 comprise a coupling 52 and a threaded bolt 54 for gap adjustment by virtue of the bearing shield 14 of the sonotrode 10 being adjusted relative to the bearing shield 16 of the anvil 12. Furthermore, in the exemplary embodiment of FIG. 5, the coupling means 20 is in a lateral arrangement. Here, a bolt is coupled to the bearing shield 14 of the sonotrode 10, and a bush which engages correspondingly into the bolt is coupled to the bearing shield 16 of the anvil 12 at the center of rotation 56.

The exemplary embodiments of FIGS. 6 to 8 show different variants of the adjustment possibilities between the bearing shield 14 of the sonotrode 10 and the bearing shield 16 of the anvil 12. FIG. 6 corresponds to the variant illustrated in FIG. 5, where the adjusting means 50 presses via the coupling 52 and the threaded bolt 54 against the lower edge of the bearing shield 14 of the sonotrode 10 and thereby effects a relative movement about the center of rotation 56. The adjusting means 50 is arranged relatively distant from the center of rotation 56. As an adjusting device 50, a servo motor is for example provided which, via the threaded bolt 54, imparts a translatory movement to the bearing shield 14. Here, the lower bearing shield 16 will function, in effect, as a base, and push the upper bearing shield 14 upward via the threaded bolt 54 as the latter is unscrewed. The force means 18 furthermore ensure that the upper bearing shield 14 always bears against the threaded bolt 54 and thus also moves downward as the threaded bolt 54 is screwed in. On account of the pressure acting continuously from above, the thread play does not have a noticeable adverse effect. The use of in each case one servo motor with threaded bolt 54 in the left-hand and right-hand bearing shields 14, 16 makes it possible for the sonotrode 10 and the anvil 12 to be automatically aligned parallel to one another. In the exemplary embodiment of FIG. 6, very small and also relatively large adjustment travels can be attained very accurately.

In the exemplary embodiment of FIG. 7, the spacing can be varied by means of an eccentric 58 which is rotatably mounted parallel to the axis of rotation of the sonotrode 10 and anvil 12. The force means 18 again effects a preload between the two bearing shields 14, 16. The rotational movement of a servo motor is converted by means of the eccentric disk 58 into a translatory movement. Whereas the eccentric disk 58 is fixedly mounted, the upper bearing shield 14 are raised and lowered by means of the eccentric disks 58.

In the exemplary embodiment of FIG. 8, an actuator 60 is provided which engages relatively close to the center of rotation 56. The actuator is for example a piezoelectric actuator 60 which converts electrical energy into a mechanical change in travel. Piezoelectric actuators 60 are advantageous because they can carry out movements in the sub-nanometer range. Furthermore, piezoelectric actuators 60 are maintenance-free and wear-free. In static operation, they require no power. Furthermore, high loads can be moved.

Figure 11:
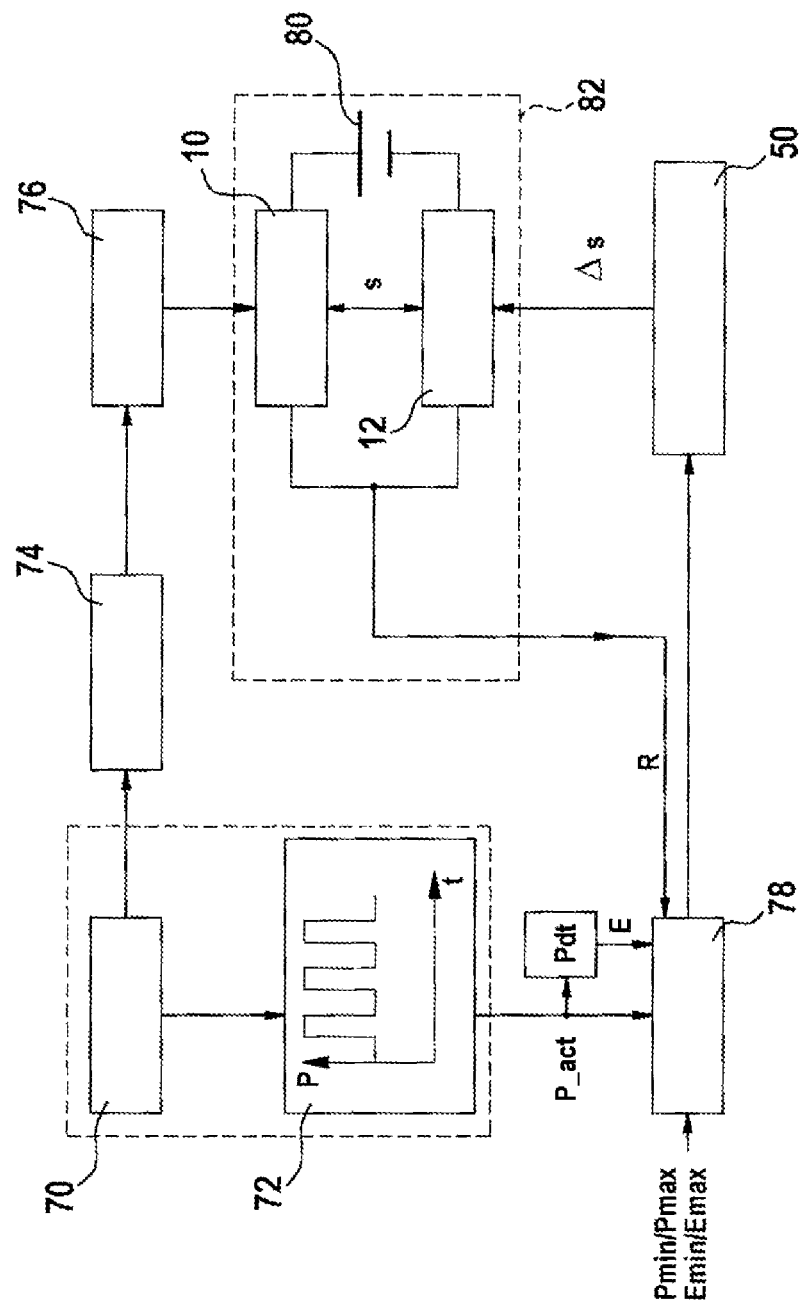
FIG. 11 shows a block circuit diagram of the regulation structure.

The input voltage of 50 Hz, 220 V is converted by an electric generator 70 into high-frequency electric alternating-current voltage. Most systems operate with 20, 30 or 35 kHz. The sound converter (converter 74) is connected to said generator 70 and in turn converts the electrical energy into high-frequency mechanical vibrations. By means of an amplitude transformation piece (booster 76), the amplitudes are amplified or reduced. Here, the change in amplitude is inversely proportional to the change in cross section of the booster 76. The high-frequency vibrations at the converter 74 are transmitted from the booster 76 to the fusion tool, specifically the sonotrode 10. The sonotrode 10 is screwed on with frictional engagement and so as to be easily exchangeable. One option for determining the change in the gap dimension s exists in the generator regulator 72 which is provided in any case. The generator 70 contains an electric oscillator circuit in which the behavior of the mechanical oscillator circuit is directly reflected. As long as the oscillator circuit, both the mechanical and the electric oscillator circuit, oscillates at its natural frequency, only the amount of energy lost through friction losses in the material and through resistance need be supplied to said oscillator circuit. If the sonotrode 10 is hindered in its natural movement by the sealing and/or cutting, this is also manifested in the electrical oscillator circuit. The energy extracted from the system in this way is proportional to the fusion amplitude and force and, in this respect, also to the fusion gap s. By parameter adjustment upon the start of operation, it is possible for a reliable range for the power P or energy E to be defined (Pmin, Pmax; Emin, Emax) in which good quality fusion takes place. If said range is departed from, the generator regulator 72 outputs a corresponding signal to a regulator or controller 78 to adapt the gap dimension s correspondingly. Corresponding to said change As, the regulator or controller 78 activates the adjusting device 50, as a result of which the sealing gap s is varied in the desired way. The generator regulator 72 generates for example the rectangular profile of the power P over time illustrated in FIG. 11. The power P assumes its maximum at the times at which the sealing surfaces of the sonotrode 10 and anvil 12 are situated directly opposite one another and ultrasound sealing is to be carried out. To obtain the desired power profile, the generator regulator 72 constantly measures the actual power P_act of the generator 70.

The regulator or controller 78 is also supplied an output signal R from a contact detection system 82, by means of which directly impending contact of the sonotrode 10 and anvil 12 is detected. For this purpose, a preferably low voltage is applied to the sonotrode 10 and anvil 12 by means of a voltage source 80. If contact occurs or is impending, the current circuit is closed, which can be identified on the basis of the output signal R. In the event of impending contact, the regulator or controller 78 increases the sealing gap s, as described in more detail below.

Both the sonotrode 10 and also the anvil 12 rotate in opposite directions and are designed, in effect, as sealing rolls. They have a plurality of sealing surfaces into which may also be integrated a cutting function for cutting the packing material. Depending on the type of packing material, a sealing gap must be set with high accuracy. A sealing gap or gap s denotes the spacing of the sealing surface of the sonotrode 10 from the sealing surface of the anvil 12. Said sealing gap s is adjusted to the desired size by adjusting means, illustrated by way of example in FIGS. 5 to 8, such as an adjusting drive 50, eccentric 58 or actuator 60. Said adjusting means act on at least one bearing shield 14 relative to the other bearing shield 16. If the size of the gap s varies during ongoing operation, the adjusting means 50 can adjust said gap back to the desired setpoint size. The force means 18, designed for example as a spring, on the end of the bearing shields 14, 16 serves to press the bearing shields 14, 16 together and impart the required sealing and/or cutting force. Furthermore, by means of the toothed belt drive, forces act on the sonotrode 10 which seek to raise the upper bearing shields 14, which is prevented by the force means 18. The force means 18 could also be of pneumatic or hydraulic design instead of a spring. The coupling means 20 serve to movably connect the bearing shield 14 of the sonotrode 10 to the bearing shield 16 of the anvil. In addition to the described variants, linear guides such as for example column guides could also be provided, which permit a relative linear movement of the bearing shields 14, 16 with respect to one another.

The bearing shields 14 form side cheeks which are connected to one another by the support means, specifically the support beam 22. The support tube 24 could also serve for stabilization and as a holding facility in the packaging machine. The drive coupling of the upper and lower sealing rolls (sonotrode 10 and anvil 12) is realized by means of toothed belts. The rotational speed of the sealing rolls is dependent on the speed of the strip of the packing tube to be sealed and may for example be event-controlled. Said dynamics are attained by means of the drive 28, for example a servo motor, which transmits the forces and torques by means of a drive element 26 designed as a toothed belt. The described device allows the parameters required for the joining process by means of ultrasound, such as for example the sealing gap s, sealing force and sealing time, to be set very precisely and in a manner appropriate to the application. The adjustment of the sealing force can be realized via the force means 18. The force means are designed for example as springs, such that it is possible for the sealing force to be adjusted linearly with respect to the spring characteristic curve. The force means 18 act on the two bearing shields 14, 16, such that the sealing force between the upper sealing roll, the sonotrode 10, and the lower sealing roll, the anvil 12, can be set.

In the contact detection system 82, a voltage of approximately 5 to 10 V is applied to the upper and lower sealing rolls, that is to say the sonotrode 10 and anvil 12. Shortly before metallic contact of the sonotrode 10 and anvil 12 occurs, the current circuit is closed, specifically in the form of an electrical sparkover. At the stated voltage, the electric strength in the case of air and atmospheric pressure is a distance of 0.6 to 1.0 μm, depending on the temperature, humidity and the presence of foreign bodies. If heating of the sonotrode 10 and anvil 12 leads to a reduction in the gap dimension s, the signal provided by the regulator or controller 78 would trigger a defined backward stroke of the upper sealing roll, specifically the sonotrode 10. Too large a gap s cannot be detected by means of the contact detection system 78.

Below, the initialization of the regulator and/or controller 78 will be described in more detail on the basis of FIG. 9. Upon the start of operation of the device 8 for processing a packing material by means of ultrasound, it must be ensured that the sealing rolls, specifically the sonotrode 10 and anvil 12, are parallel to one another. After the start of the initialization (step 101), the sealing rolls 10, 12 are placed into the sealing position (step 102). For this purpose, the sealing rolls 10, 12 should be manually aligned with one another such that the lugs of the sonotrode 10 and anvil 12 are situated opposite one another. Said position is stored in the machine controller. The sonotrode 10 and anvil 12 are moved relative to one another such that they are brought into contact with one another, wherein the side at which contact takes place is not known. For this purpose, both sides are lowered in parallel until contact occurs (steps 102, 103). Subsequently, the sonotrode 10 is raised by Δha to a starting gap. It is detected by means of the contact detection system 82 whether the sonotrode 10 and anvil 12 are in contact, because in this case, a current flows via the sealing rolls 10, 12. Thereafter, firstly the right-hand side (step 104) and then the left-hand side (step 105) are lowered until contact occurs and in each case raised again by the change in travel ΔHr and ΔHl respectively registered here. If the sonotrode 10 and anvil 12 are not parallel to one another, the corrective factor K can be calculated (steps 108 and 111) from said two changes in travel ΔHr and ΔHl respectively, from the bearing spacing B and from the roll width b of the sonotrode 10:

$$K=(\Delta Hr-\Delta Hl)*(B+b)/2b) \qquad \text{(step 108)}$$

and $$K=(\Delta Hl-\Delta Hr)*(B+b)/2b) \qquad \text{(step 111)}.$$

After the higher side is lowered by K (or the lower side is raised by K), the sonotrode 10 and anvil 12 are parallel. In step 110, both sides are lowered until contact occurs and then both sides are raised, in parallel, to the fusion gap s. The initialization is thereby complete (step 113).

After the initialization according to FIG. 9, the sealing rolls 10, 12 move into the start position (the sealing lugs are not in contact in order to thread in the packing material and start the machine). The gap regulation realized in the regulator or controller 78 is now explained in more detail in FIG. 10.

After the sealing gap s has been set to the predefined sealing gap s by means of the initialization (step 202 according to the approach of FIG. 9), heating of the sonotrode 10 and anvil 12, and therefore a reduction in the gap dimension s, occur during the course of operation. The corresponding regulating circuit for gap regulation with the already described gap measurement and gap adjustment to the required sealing gap is illustrated in FIG. 10 as a function of environmental influences, the adjusting device 50, the ambient temperature, the sealing roll temperature etc. (cf. step 203). The desired gap dimension is determined from the environmental influences (step 204). At the sealing time, the gap s is measured (step 206), specifically when the sealing surfaces of the sonotrode 10 and anvil 12 are adjacent to one another. At this time, it is checked whether the sonotrode 10 and anvil 12 are in contact (step 208). This takes place by means of the contact detection system 82. If it is concluded, on account of a current flow, that the sonotrode 10 and anvil 12 are in contact, the gap s is increased (step 207). The gap measurement by means of the generator regulator 72 takes place in parallel. For this purpose, upon every $(m+1)^{th}$ (m is equal to the number of sealing lugs) engagement of the sealing rolls 10, 12, at the sealing time, the power P_act delivered by the generator regulator 72 is compared with the admissible power Pmin, Pmax. The admissible power, which lies within the limits Pmin and Pmax, is defined by the parameter setting upon the start of operation and encompasses the power range Pmin to Pmax in which good quality fusion takes place. If the measured electrical power P_act deviates in the upward direction from the admissible range Pmax (P_act>Pmax), the gap is too narrow (query 213) and the gap is increased (step 214). As a result of this, the adjusting drive 50 is triggered so as to increase the gap s by a few μm. If the power P_act is lower than the admissible power Pmin (P_act<Pmin; query 212), the gap must be reduced (step 215). It would alternatively also be possible for further suitable electric variables as output variables of the generator 70, such as for example the energy E (as an integral of the power P), to be compared with corresponding limit values Emax, Emin, or else current, voltage etc.

Independently of the generator regulator 72, the contact detection system 82 monitors in parallel the spacing between the sonotrode 10 and anvil 12 (step 208). When the current circuit of the contact detection system 82 closes, that is to say the sealing rolls 10, 12 come into contact, a backward stroke of the upper roll, in this case the sonotrode 10, is triggered independently of the generator regulator 72, such that the gap s is increased (step 207).

The described device 8 is suitable in particular for the formation of a transverse sealing seam for tubular bags, but is not restricted to this. Tubular bag machines of said type may be arranged horizontally or vertically depending on the product to be packed.

The invention claimed is:

1. A device for processing a packing material by means of ultrasound, comprising
    at least one sonotrode (10),
    at least one anvil (12), wherein for the purposes of ultrasound sealing of a packing material a gap (s) through which the packing material can be guided is formed between the sonotrode (10) and anvil (12),
    at least one adjusting means (50) which adjusts the gap (s) between the sonotrode (10) and anvil (12),
    at least one generator (70) which converts an input voltage into a suitable output voltage which is converted by a converter (74) into mechanical vibrations in order to generate ultrasound vibrations at the sonotrode (10),
    characterized in that a regulator and/or controller (78) is provided for the regulation and/or control of the gap (s) between the sonotrode (10) and anvil (12) as a function of at least one electric variable from the group consisting of the power (P) of the generator (70), the energy (E) of the generator (70), and a resistance (R) between the sonotrode (10) and the anvil (12).

2. The device as claimed in claim 1, characterized in that at least one output variable (P, E) of the generator (70) is used as an electric variable.

3. The device as claimed in claim 1, characterized in that the adjusting means (50) varies the gap (s) between the sonotrode (10) and anvil (12) if at least the output variable (P, E) of the generator (70) exceeds or undershoots a limit value (Pmin, Pmax; Emin, Emax).

4. The device as claimed in claim 1, characterized in that the adjusting means (50) increases the gap (s) between the sonotrode (10) and anvil (12) if the output variable (P, E) of the generator (70) exceeds a limit value (Pmax; Emax).

5. The device as claimed in claim 1, characterized in that at least one electric output variable (R) of a contact detection system (82), which serves to detect impending contact between the sonotrode (10) and anvil (12), is provided as an electric variable.

6. The device as claimed in claim 5, characterized in that, for contact detection (82) between the sonotrode (10) and anvil (12), an electrical voltage (80) is applied.

7. The device as claimed in claim 1, characterized in that a contact detection system (82) detects impending contact of the sonotrode (10) and anvil (12) if a current flows between the sonotrode (10) and anvil (12).

8. The device as claimed in claim 1, characterized in that the adjusting means (50) increases the gap (s) between the sonotrode (10) and anvil (12) if a contact detection system (82) suggests impending contact of the sonotrode (10) and anvil (12).

9. The device as claimed in claim 1, characterized in that, during the course of an initialization, as a function of an output signal of a contact detection system (82), the adjusting means (50) adjusts the sonotrode (10) and anvil (12) relative to one another such that they are arranged parallel to one another.

10. The device as claimed in claim 1, characterized in that, during the course of an initialization, as a function of a change in travel (ΔHr or ΔHl) until contact of the sonotrode (10) and anvil (12) occurs, the adjusting means (50) adjusts the sonotrode (10) and anvil (12) relative to one another by a corrective factor (K).

11. A method for processing a packing material by means of ultrasound, wherein for the purpose of ultrasound sealing of a packing material a gap (s) through which the packing material is guided is formed between a sonotrode (10) and an anvil (12), wherein the gap (s) between the sonotrode (10) and anvil (12) can be adjusted, wherein an input voltage is converted into a suitable output voltage which is converted into mechanical vibrations in order to generate ultrasound vibrations at the sonotrode (10), characterized in that the gap (s) between the sonotrode (10) and anvil (12) is varied as a function of at least one electric variable from the group consisting of the power (P) of the generator (70), the energy (E)

of the generator (70), and a resistance (R) between the sonotrode (10) and the anvil (12).

12. The method as claimed in claim 11, characterized in that at least one output variable (P, E) of a generator (70) which converts the input voltage into an output voltage is used as an electric variable.

13. The method as claimed in claim 11, characterized in that the gap (s) between the sonotrode (10) and anvil (12) is varied if at least an output variable (P, E) of a generator (70) exceeds or undershoots a limit value (Pmin, Pmax; Emin, Emax).

14. The method as claimed in claim 11, characterized in that the gap (s) between the sonotrode (10) and anvil (12) is increased if an output variable (P, E) of a generator (70) exceeds a limit value (Pmax; Emax).

15. The method as claimed in claim 11, characterized in that at least one electric output variable (R) of a contact detection system (82), which serves to detect impending contact between the sonotrode (10) and anvil (12), is used as an electric variable.

16. The method as claimed in claim 11, characterized in that, for contact detection (82) between the sonotrode (10) and anvil (12), an electrical voltage (80) is applied.

17. The method as claimed in claim 11, characterized in that a contact detection system (82) detects impending contact of the sonotrode (10) and anvil (12) if a current flows between the sonotrode (10) and anvil (12).

18. The method as claimed in claim 11, characterized in that the gap (s) between the sonotrode (10) and anvil (12) is increased if a contact detection system (82) suggests impending contact of the sonotrode (10) and anvil (12).

19. The method as claimed in claim 11, characterized in that, during the course of an initialization, as a function of an output signal of a contact detection system (82), the sonotrode (10) and anvil (12) are adjusted relative to one another such that they are arranged parallel to one another.

20. The method as claimed in claim 11, characterized in that, during the course of an initialization, as a function of a change in travel ($\Delta Hr$ or $\Delta Hl$) until contact of the sonotrode (10) and anvil (12) occurs, the sonotrode (10) and anvil (12) are adjusted relative to one another by a corrective factor (K).

* * * * *